United States Patent
Squires

(10) Patent No.: US 9,591,844 B2
(45) Date of Patent: Mar. 14, 2017

(54) ANATOMICALLY CORRECT GAME CALL

(71) Applicant: COPPER BASIN, LLC, Nampa, ID (US)

(72) Inventor: Kelly William Squires, Nampa, ID (US)

(73) Assignee: COPPER BASIN, LLC, Nampa, ID (US)

( * ) Notice: Subject to any disclaimer, the term of this patent is extended or adjusted under 35 U.S.C. 154(b) by 0 days.

(21) Appl. No.: 14/592,220

(22) Filed: Jan. 8, 2015

(65) Prior Publication Data
US 2015/0196021 A1 Jul. 16, 2015

Related U.S. Application Data

(60) Provisional application No. 61/925,834, filed on Jan. 10, 2014.

(51) Int. Cl.
*A01M 31/00* (2006.01)
*A63H 5/00* (2006.01)

(52) U.S. Cl.
CPC ................................ *A01M 31/004* (2013.01)

(58) Field of Classification Search
CPC .... A01M 31/004; A01M 31/06; A01M 31/00; G10D 7/12; G10D 9/043; G10D 9/02; G10D 7/023; A63H 5/00; A63H 33/00; A41G 7/00
USPC ................................................. D22/119, 125
See application file for complete search history.

(56) References Cited

U.S. PATENT DOCUMENTS

| | | | | |
|---|---|---|---|---|
| 209,274 | A * | 10/1878 | La Montagne | 446/208 |
| 1,855,527 | A * | 4/1932 | Muehlstein | 446/200 |
| 2,227,242 | A * | 12/1940 | Boutin | A01M 31/06 43/3 |
| 2,296,785 | A * | 9/1942 | Hoeflich | 446/209 |
| 2,296,786 | A * | 9/1942 | Hoeflich | 446/209 |
| D153,275 | S * | 4/1946 | Frazeur | D21/411 |
| 2,551,367 | A * | 5/1951 | Fahey | 84/380 R |
| 2,555,240 | A * | 5/1951 | Muehlstein | A01M 31/004 446/200 |
| 2,564,942 | A * | 8/1951 | Wemmer, Sr. | A01M 31/004 43/3 |
| 2,583,400 | A * | 1/1952 | Wade | 446/188 |
| 2,606,324 | A * | 8/1952 | Mafko | A41G 7/02 2/206 |
| 2,681,055 | A * | 6/1954 | Gowland | 124/62 |
| 2,972,834 | A * | 2/1961 | Bacon | 446/200 |
| 3,034,245 | A * | 5/1962 | Lynch | A01M 31/06 43/3 |
| 3,131,590 | A * | 5/1964 | Lee | 84/330 |
| 3,327,579 | A * | 6/1967 | Brimhall | 84/375 |
| 3,466,794 | A * | 9/1969 | McBroom et al. | 446/206 |
| 3,512,299 | A * | 5/1970 | Meyer | 446/200 |
| 3,802,120 | A * | 4/1974 | Erhart | 446/77 |

(Continued)

*Primary Examiner* — Aarti B Berdichevsky
*Assistant Examiner* — Urszula M Cegielnik
(74) *Attorney, Agent, or Firm* — Parsons Behle & Latimer

(57) ABSTRACT

A game call for the producing of sounds that mimic animal sounds better than conventional game calls. The call may include various structures of that mimic or correspond to various features found in the mouth, nasal passageways, and/or trachea opening of an animal. The body of the call may be connected to a mouth piece to enable a user to provide a sound by blowing air through the call.

23 Claims, 7 Drawing Sheets

(56) References Cited

U.S. PATENT DOCUMENTS

| | | | | |
|---|---|---|---|---|
| 3,883,982 | A | * | 5/1975 | McClary ............... A63H 37/00 2/206 |
| 4,649,790 | A | * | 3/1987 | Weeks ............................ 84/384 |
| 4,821,670 | A | * | 4/1989 | Foxcroft et al. .......... 116/137 R |
| 4,998,456 | A | * | 3/1991 | Kahonen ........................ 84/384 |
| 5,019,008 | A | * | 5/1991 | Hughes ......................... 446/207 |
| 5,293,805 | A | * | 3/1994 | Guardala et al. ........... 84/383 R |
| 5,736,662 | A | * | 4/1998 | Spector ........................... 84/600 |
| 5,910,039 | A | * | 6/1999 | Primos et al. ................ 446/207 |
| 5,970,522 | A | * | 10/1999 | Apichom ................ A41G 7/02 2/206 |
| 6,053,794 | A | * | 4/2000 | Weiser .......................... 446/207 |
| 6,924,424 | B2 | * | 8/2005 | Sueta et al. ................. 84/464 A |
| 6,926,578 | B1 | * | 8/2005 | Casias .................. A01M 31/004 446/202 |
| 7,011,564 | B2 | * | 3/2006 | Ady .................... A01M 31/004 446/207 |
| 7,357,693 | B1 | * | 4/2008 | Roberts ............... A01M 31/004 446/204 |
| 7,465,213 | B1 | * | 12/2008 | Pribbanow .......... A01M 31/004 446/202 |
| D592,727 | S | * | 5/2009 | Walton ......................... D22/125 |

\* cited by examiner

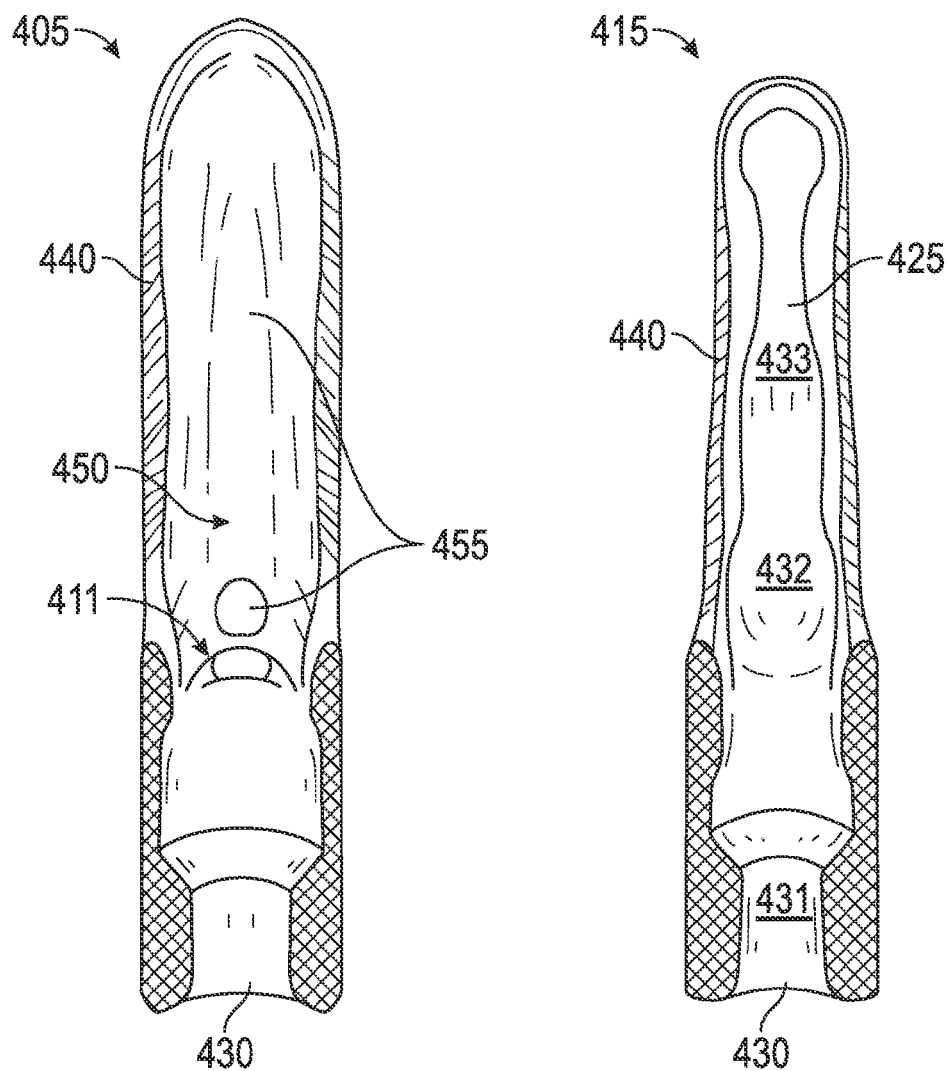

ANATOMICALLY CORRECT GAME CALL

CROSS REFERENCE TO RELATED APPLICATION

This present application claims the benefit of priority under 35 U.S.C. §119 to U.S. Provisional Patent Application No. 61/925,834, filed Jan. 10, 2014, entitled "ANATOMICALLY CORRECT GAME CALL," the disclosure of which is incorporated herein by reference in its entirety.

BACKGROUND

Field of the Disclosure

The embodiments described herein relate to a game call that is man-made, but anatomically correct. The game call may include structures that mimic actual anatomic features found in actual mammal or bird species. The call is designed to produce a more natural call.

Description of the Related Art

Current game calls are designed to mimic the sound or call of a particular animal usually a mammal or bird. Present game calls are designed for amplification purposes only and the call itself cannot duplicate the pitch and/or tone made by the specific species the call is designed for. Instead, current game calls rely on the skill and knowledge of the caller to attempt to adequately mimic the sound of a desired animal.

Present game calls are not anatomically correct. Game calls that appear to mimic the anatomical structure of an animal do not include the correct inner anatomy of the mouth and nose of an animal. The lack of correct inner anatomy of the mouth, nose, and/or throat may lead to a call that is inauthentic and/or lacks the proper tone and/or pitch. Animals resonate sound by pushing air from their lungs, which passes the trachea, vocal chords, and exits through the mouth and nasal passageways. A game call that does not include the accurate structure of the mouth, nasal passageways, and trachea opening simply cannot create an authentic sound of the desired animal, which may be a mammal or a bird.

SUMMARY

The present disclosure is directed to a game call that overcomes some of the problems and disadvantages discussed above.

One embodiment is a mouth operated game call comprising a body, a cavity within the body, and a single opening at a first end of the body, the single opening at the first end in communication with the cavity. The call comprises a mouth piece connected to the first end of the body, a bore in the mouth piece in communication with the cavity within the body. The call includes an opening at a second end of the body, the opening at the second end in communication with the cavity. The call includes a first aperture in the body in communication with the cavity and a second aperture in the body in communication with the cavity, the first and second apertures being located closed to the second end of the body than the first end of the body.

The first and second apertures of the call may be in communication with the cavity via an internal passage within the body and an internal opening. The call may include a longitudinal upstanding structure within the cavity, at least a portion of the upstanding structure being positioned adjacent the opening at the second end. The longitudinal upstanding structure may be shaped to mimic a tongue. The entire length of the upstanding structure may be integral with the body. The body of the call at the second end may include an upper portion and a lower portion that are separated by the second opening. The call may include a plurality of ridges on the upper portion. The ridges on the upper portion may be positioned at the outer edges of the upper portion. The cavity of the body may have a first portion, a second portion, and a third portion, the first portion being a bore having a first diameter, the second portion being a bore having a second diameter that differs from the first diameter, and the third portion that separates the body at the second end into an upper portion and a lower portion. The body may be comprised of plastic. The call may include a reed connected to the mouth piece.

One embodiment is a mouth operated game call comprising a body, a cavity within the body, and a single opening at a first end of the body, the single opening at the first end in communication with the cavity. The call includes an opening at a second end of the body, the opening at the second end in communication with the cavity. The call includes a first and second aperture in the body in communication with the cavity, the first and second apertures being located closer to the second end of the body than the first end of the body.

The call may include a longitudinal upstanding structure within the cavity, at least a portion of the upstanding structure being positioned adjacent the opening at the second end. The longitudinal structure may be shaped to mimic a tongue. The entire length of the upstanding structure may be integral with the body. The body at the second end may comprise an upper portion and a lower portion separated by the second opening. The first and second apertures may be in communication with the cavity via a third opening in the upper portion. The call may include a passage within the upper portion of the body that connects the third opening with the first and second aperture, the passage being separate from the cavity of the body. The call may include a structure that divides the passage into a first portion connected to the first aperture and a second portion connected to the second aperture. The call may include a plurality of ridges on the upper portion. The upper portion of the call may include a first set of protrusions on an outer edge within the cavity and a second set of protrusions on an outer edge within the cavity opposite the first set of protrusions. The lower portion of the call may include a first set of protrusions positioned adjacent the second end of the body. The opening at the first end of the body may have a smaller diameter than the opening at the second end of the body. The body may be comprised of plastic. A portion of the exterior of the body may include a camouflage pattern. The call may include a reed positioned adjacent the single opening at the first end of the body.

BRIEF DESCRIPTION OF THE DRAWINGS

FIG. 14 shows an interior view of an upper portion of one embodiment of a game call.

FIG. 15 shows an interior view of a lower portion of one embodiment of a game call.

Figure 1:
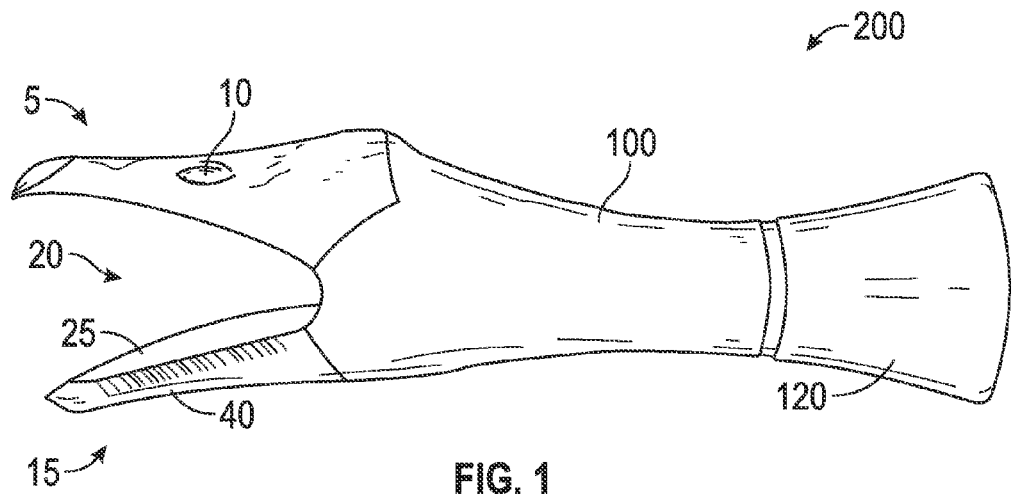
FIG. 1 shows a side view of one embodiment of a game call.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

The game call of the present disclosure may be hand cast, sculpted, and measured off an actual animal, such as a mammal or bird. The game call may include the structures that mimic anatomical structures of the upper and lower jaw, external and internal mouth, gingiva or gums, external and internal nose, trachea, epiglottis, and/or nasal pharynx. The game call may include the structures that mimic actual anatomical structures of the animal including lips, tongue, pharynx, oropharynx, oral mucosa, laryngeal pharynx, soft and/or hard palate, teeth, nasal cavities and passages, sinuses, septum, nasal airway, and/or the junction of the nasal passage to the trachea. The exterior of the game call may include sculpting of the nose pad and surrounding tissue, muzzle and/or bone structure and muscle, and the upper and lower jaw. The inner mouth and/or inner nasal areas may include flocking and/or soft membranes for sound dampening, acoustics, and/or vibration. The mouth opening may be modeled to be accurate according to the specified animal, such as a mammal or bird. The exterior of the game call may be camouflaged to help conceal the device and/or may be colored to match the coloring of a specified animal. The game call may include an adjustable epiglottis/trachea device mechanism may be located rearward of the trachea and tongue or nasal junction to add back pressure, which may cause the need of less air to produce accurate pitch and/or tone to reproduce an accurate sound. The game call may be modeled with accurate anatomical details of a specified animal. The anatomical structures may create a sound that is more authentic with the appropriate pitch and/or tone of the sound typically produced by the animal.

Figure 16:
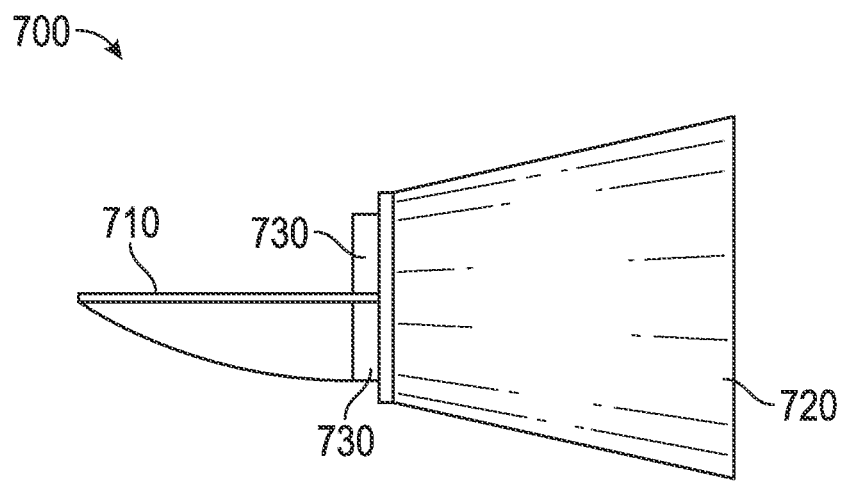
FIG. 16 shows an embodiment of a reed system that may be used in with a game call.

FIG. 1 shows a side view of one embodiment of a game call 200, which may be anatomically correct for water fowl, such as a goose. The call 200 includes a body portion 100 that roughly corresponds to a head portion of the water fowl connected to a mouth piece 120. The mouth piece 120 includes a bore that is in communication with a cavity within the interior of the body 100. The mouth piece 120 may use a reed system, such as shown in FIG. 16 and/or FIG. 17. A user may blow through the mouth piece 120 connected to the body 100 to create a sound that mimics the actual sound made from the desired water fowl, such as a goose. The body 100 includes a first opening 30 (shown in FIG. 4-5) at a first end of the body 100 and a second opening 20 as a second end of the body 100.

The game call 200 includes structures that mimic the anatomical features of the animal that the call 200 is designed to replicate the sound of. For example, the call 200, in particular the body 100 portion of the call 200, may include apertures 10 in an upper portion 5 of the body 100 that affect the sound produced when air is blown through the call 200 via the mouth piece 120. The body 100 may also include an upstanding structure 25 that affects the sound produced. The upstanding structure 25 may be a longitudinal structure that is positioned adjacent the second end of the body 100. The structure 25 may mimic a tongue of a desired animal. The structure 25 may be integral to the body 100 unlike an actual tongue of an animal. In other words, the structure 25 may be integral or connected to the body 100 along its entire length. The body 100 may include a series of grooves 40 adjacent the second opening 20. The grooves 40 may affect the sound produced by the call 200. The grooves 40 may mimic teeth plates present in water fowl.

Figure 2:
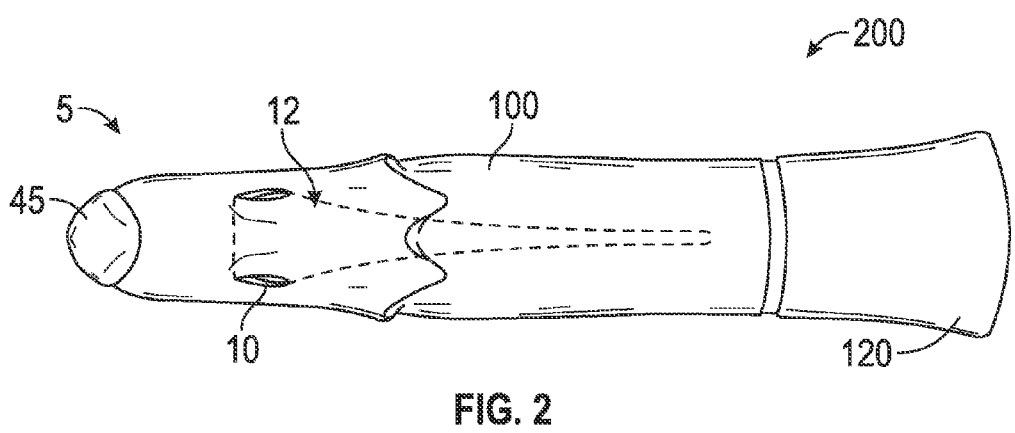
FIG. 2 shows a top view of one embodiment of a game call.
Figure 3:
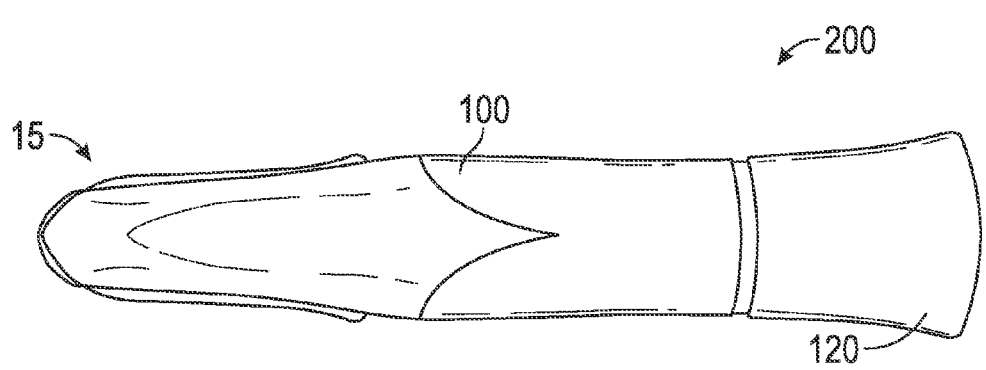
FIG. 3 shows a bottom view of one embodiment of a game call.

FIG. 2 shows a top view of a portion of a call 200. The body 100 of the call 200 may include at least two apertures 10 that are in communication with the cavity within the body 100. The upper portion 5 may include an end structure 45 that mimics the bean found on a beak of a water fowl, which may affect the sound produced by the call 200. FIG. 3 shows a bottom view of the lower portion 15 of the body 100 of the call 200. The call 200 may be formed by various mechanisms to form a call that mimics the anatomical structure of an animal as discussed herein. The call 200 may be formed of various plastics or other materials that would be appreciated by one of ordinary skill in the art having the benefit of this disclosure. For example, the call 200 may be comprised of polystyrene, glass-filled nylon, or other various plastics.

Figure 4:
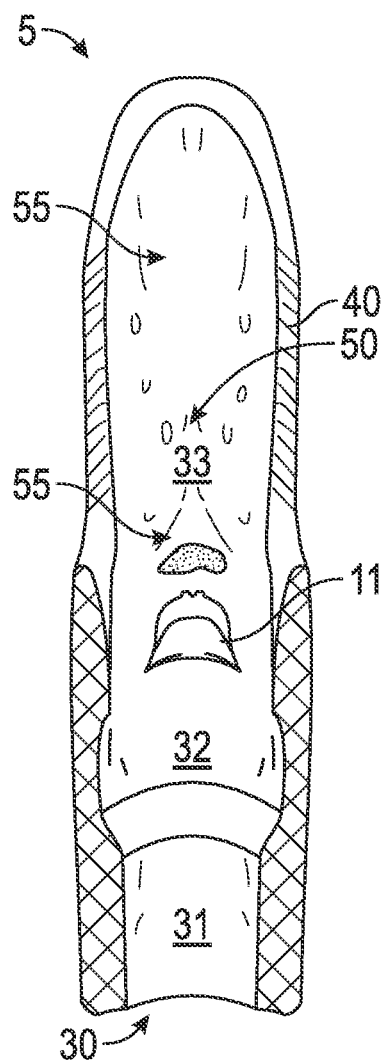
FIG. 4 shows an interior view of an upper portion of one embodiment of a game call.
Figure 5:
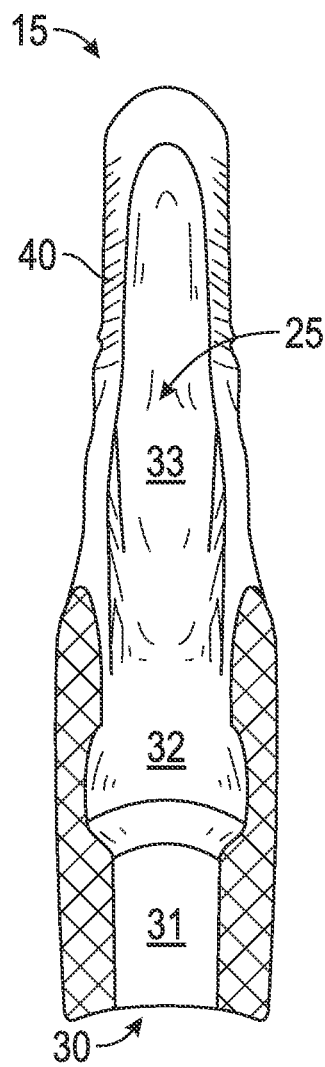
FIG. 5 shows an interior view of a lower portion of one embodiment of a game call.

FIG. 5 shows an interior view of the lower portion 15 of the body 100 with the mouth piece 120 removed. Likewise, FIG. 4 shows an interior view of the upper portion 5 of the body 100 with the mouth piece 120 removed. The upper and lower portions 5 and 15 form an interior cavity through which a user may blow through to produce a sound of a desire animal. The interior portions of the body 100 may be configured to include various structures that mimic anatomical features of a desired animal so that the call 200 produces an authentic sound. The cavity may include a first portion 31 adjacent the first opening 30, a second portion 32, and a third portion 33. The first and second portions 31 and 32 are generally enclosed by the body 100 and may have different diameters. The diameter of the first portion 31 may be smaller than the diameter of the second portion 32. As shown in FIGS. 4 and 5, each of the portions 31 and 32 may not have a constant diameter. The third portion 33 of the cavity may be positioned adjacent the second opening 20, which may correspond to the mouth of the specified animal. Thus, the third portion 33 of the cavity may not be entirely enclosed, but rather be open to the exterior by gaps between the upper and lower portions 5 and 15.

The upper and lower portions 5 and 15 may include grooves 40 that affect the sound produced by the call 200. The grooves 40 may be positioned to mimic teeth plates of a water fowl, such as a goose. The lower portion 15 may include a longitudinal upstanding structure 25 that extends from the body 100 toward the cavity. The structure 25 may mimic a tongue of an animal except that it is integrally formed or connected to the lower portion 15 along its entire length. The interior of the upper portion 5 of the body 100 may include various features 11, 50, and 55 that may affect the sound as air is blown through the body 100. For example, the features 50 and 55 may mimic various hard palate details such as a salivary gland and feature 11 may mimic a nasal junction. The body 100 may include internal passage(s) 12 as shown in FIG. 2 that connects internal feature 11 with external apertures 5 in the upper portion 5 of the body 100. A reed (shown in FIG. 16 and FIG. 17) may help the user in combination with the anatomically correct head portion 100 to reproduce an authentic water fowl sound.

Figure 6:
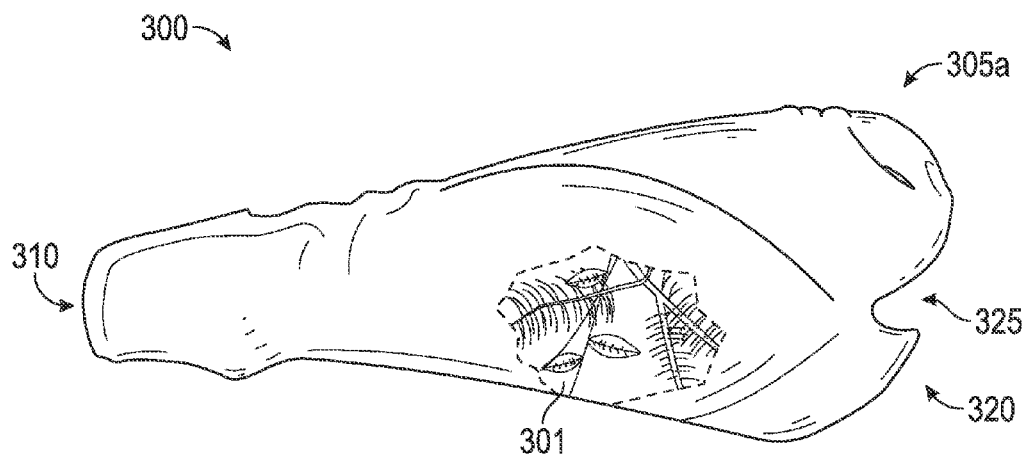
FIG. 6 shows a side view of one embodiment of a game call.

FIG. 6 shows an embodiment of a call 300. The call could be configured to produce a sound that mimics various animals. For example, the call could be used to mimic the sound of various big game animals such as deer, elk, moose, antelope, etc. The call 300 includes an upper portion 305*a* and a lower portion 305*b* that from a cavity within the call 300. The call 300 may be formed by joining the two portions 305*a* and 305*b* together or the call 300 may be formed with the two portions being integrated into a single call 300. The call has a first end 310 through which a user will blow and a second end 320. The first end 310 includes a first opening 315, which may mimic the size and/or shape of the trachea of a desired animal for the call 300 to replicate the sound of. The second end 320 includes a second opening 325 from which the produced sound will be projected from. The second opening may replicate the mouth opening of an animal. A portion of the exterior of the call 300 may include a color or pattern, such as camouflaged pattern 301 as shown in FIG. 6, which may prevent the visual detection of the call 300 by wildlife. The camouflage pattern 301 may cover the entire exterior of the call 300 or only a portion of the call 300 as would be appreciated by one of ordinary skill in the art having the benefit of this disclosure.

Figure 8:
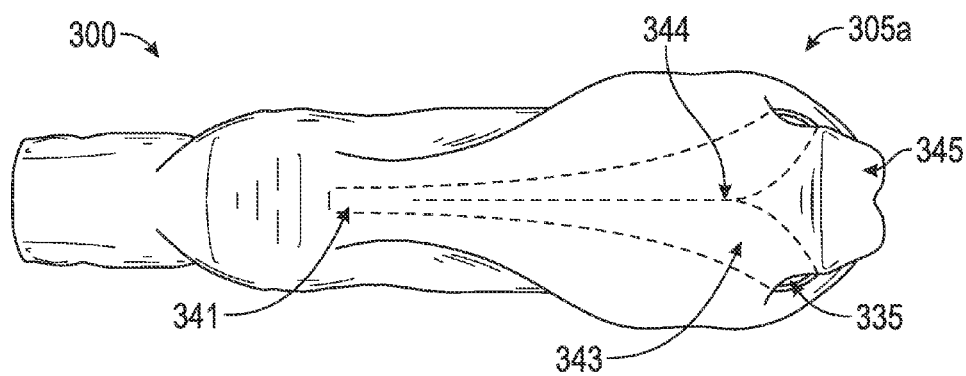
FIG. 8 shows a top view of one embodiment of a game call.
Figure 7:
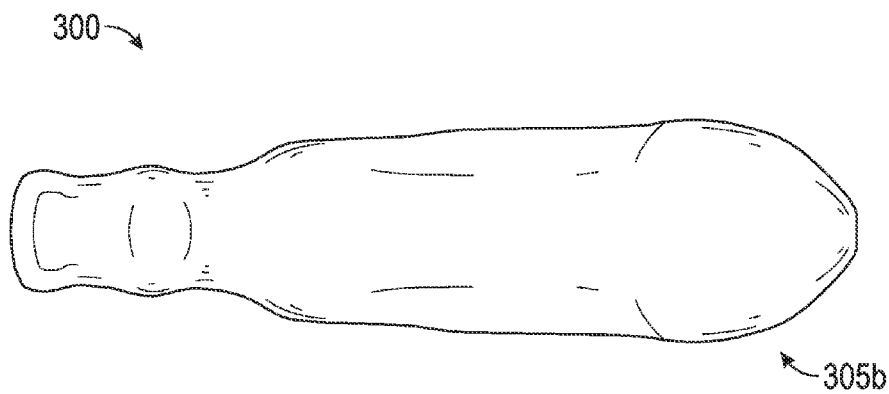
FIG. 7 shows a bottom view of one embodiment of a game call.
Figure 9:
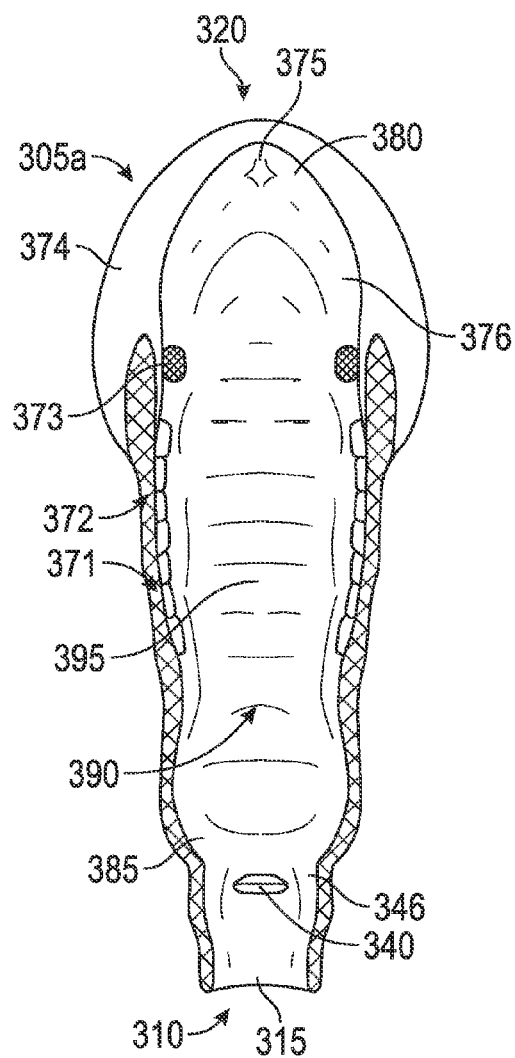
FIG. 9 shows an interior view of an upper portion of one embodiment of a game call.

FIG. 7 shows a bottom view of the lower portion 305*b* of the call 300 and FIG. 8 shows a top view of the call 300. The call may include a third opening 340 (shown in FIG. 9) in the interior that provides communication between the cavity within the call and a passage 341 in the upper portion 305*a* of the call. The passage 341 connects the third opening 340 with apertures 335 on the exterior of the upper portion 305*a* of the call 300. The passage 341 may include a structure 344 that divides the passage 341 into two portions 343 with each portion being connected to a single aperture 335 on the exterior of the upper portion 305*a* of the call 300. The second end 320 of the upper portion 305*a* of the call 300 may include a structure 345 adjacent to the exterior apertures 335, which may affect the sound produced by the call 300. The structure 345 may mimic the nose pad of an animal, which could be soft and/or comprised of flocking. The passage 341 in the call 300 may mimic a sinus or nasal passageway of an animal and the apertures 335 may mimic nostril openings of an animal.

Figure 10:
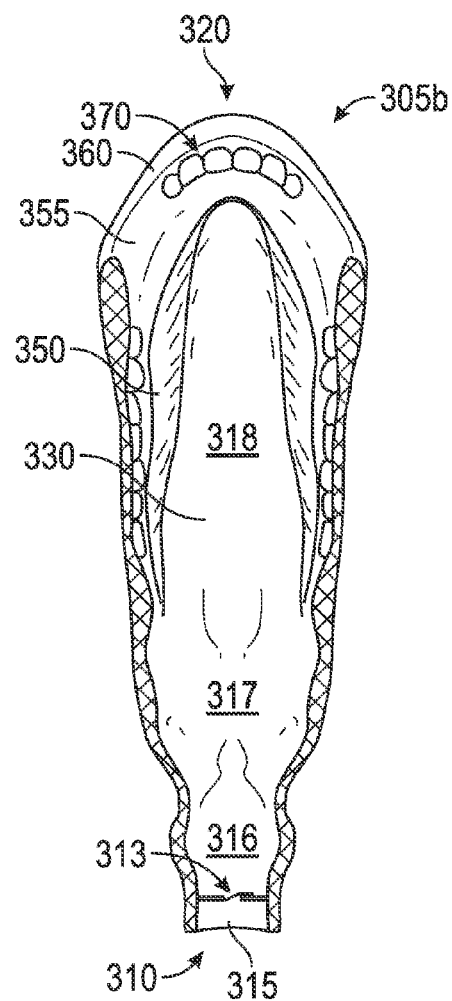
FIG. 10 shows an interior view of a lower portion of one embodiment of a game call.

The third opening 340 (shown in FIG. 9) on the interior of the call 300 may be positioned within a first portion 316 (shown in FIG. 10) of the cavity of the call 300. The interior of the call 300 may include structures 346 adjacent to the third opening 340 that mimic epiglottis of an animal. The first portion 316 may be adjacent to the first opening 315. The upper portion 305*a* of the call 300 may include a junction 385 between the first portion 316 and the second portion 317 (shown in FIG. 10) of the cavity that mimics the soft palate of an animal. The call 300 may include a second portion 317 of the cavity that has a larger diameter than the first portion 316. The interior of the upper portion 305*a* of the call 300 may include a plurality of ridges 390 that affect the sound produce by the call 300 when a user blows through the first opening 315. The ridges 390 may be transverse ridges that mimic palatine ridges of an animal. The upper portion 305*a* of the call 300 may include a structure 395 that mimics the hard palate of an animal. A portion of the upper portion 305*a* that corresponds to the second portion 317 of the cavity may include a structure that mimics the hard palate of an animal. The upper portion 305*a* may include a plurality of projections 373 located along the edge of the cavity that affect the sound of the call 300. The second end 320 of the upper portion 305*a* may include various structures 374-376 and 380 that mimic various structures on the upper portion of the mouth of an animal that may affect the sound of the call 300. For example, the structures 374-376 and 380 may mimic a lip, incisive papilla, a cheek papilla, and/or a pad, which may be soft and/or comprised of a soft material such as rubber. The game call may include an adjustable epiglottis/trachea device mechanism 313 located in the first portion 316 of the cavity to add back pressure, which may cause the need of less air to produce accurate pitch and/or tone to reproduce an accurate sound.

The upper portion 305*a* may include a plurality of projections 371 and 372 along the edge of the cavity that affect the sound as air is blown through the call. The projections 371 and 372 may mimic the size, shape, and/or location of molars and premolars of an animal. The lower portion 305*b* may include a plurality of projections 370 located at the second end 320 of the call 300 that affect the sound of the call 300. The plurality of projections 370 may mimic incisors of an animal. The second end 320 of the lower portion 305*b* may include various structures 350, 355, and 360 that mimic various structures on the lower portion of the mouth of an animal that may affect the sound of the call 300. For example, the structures 350, 355, and 360 may mimic a cheek papilla, gingiva, and/or a lip. The interior of the lower portion 305*b* of the call 300 may include a longitudinal upstanding structure 330 location in a third portion 318 of the cavity. The structure 330 may affect the sound of the call. The structure 330 may mimic the tongue of an animal except that the structure 330 is integral and/or connected to the lower portion 305*a* along its entire length. The user may use a reed (shown in FIG. 16 and FIG. 17) and/or a mouth piece in connection with the tracheal opening 315. Alternatively, the user may simply blow through the tracheal opening 315 to reproduce an authentic elk, or other animal, sound.

Figure 11:
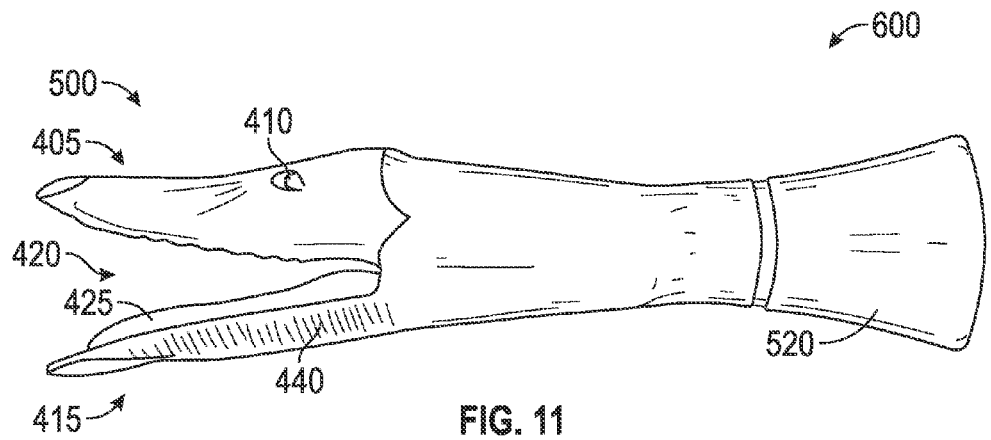
FIG. 11 shows a side view of one embodiment of a game call.

FIG. 11 shows a side view of one embodiment 600 of a game call, which may be anatomically correct for water fowl, such as a duck. The call 600 includes a body portion 500 that roughly corresponds to a head portion of the water fowl connected to a mouth piece 520. The mouth piece 520 includes a bore that is in communication with a cavity within the interior of the body 500. A user may blow through the mouth piece 520 connected to the body 500 to create a sound that mimics the actual sound made from the desired water fowl, which in this case may be a duck. The body 500 includes a first opening 430 (shown in FIG. 14-15) at a first end of the body 500 and a second opening 420 as a second end of the body 500.

In the embodiment of the game call 600 shown in FIGS. 11-15, the body 500 includes structures that mimic the anatomical features of a duck that are designed to replicate the sound of a duck. For example, the call 600, in particular the body 500 portion of the call 600, may include apertures 410 in an upper portion 405 of the body 500 that affect the sound produced when air is blown through the call 600 via the mouth piece 520. The body 500 may also include an upstanding structure 425 that affects the sound produced. The upstanding structure 425 may be a longitudinal structure that is positioned adjacent the second end of the body 500. The structure 425 may mimic a duck tongue. However, the structure 425 may be integral or connected to the body 500 along its entire length thus differing from an actual tongue of a duck. The body 500 may include a series of grooves 440 adjacent the second opening 420. The grooves 440 may affect the sound produced by the call 600. The grooves 440 may mimic teeth plates present in a duck.

Figure 12:
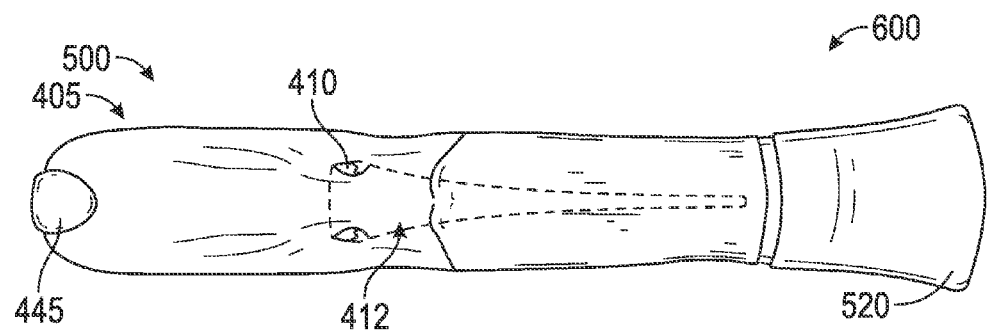
FIG. 12 shows a top view of one embodiment of a game call.
Figure 13:
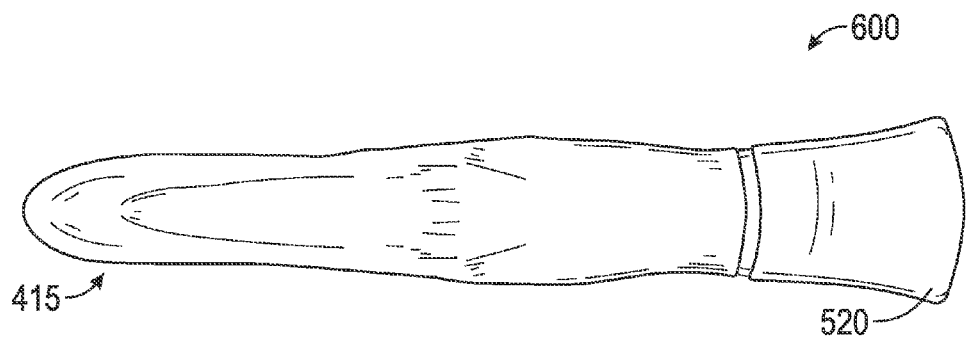
FIG. 13 shows a bottom view of one embodiment of a game call.

FIG. 12 shows a top view of a portion of a call 600. The body 500 of the call 600 may include at least two apertures 410 that are in communication with the cavity within the body 500. The two external apertures 410 may be in communication with the cavity via an internal passage(s) 412 and an internal opening 411 (shown in FIG. 14). The upper portion 405 may include an end structure 445 that mimics the bean found on a beak of a duck, which may affect the sound produced by the call 600. FIG. 13 shows a bottom view of the lower portion 415 of the body 500 of the call 600. The call 600 may be formed by various mechanisms to form a call 600 that mimics the anatomical structure of a duck, as discussed herein. The call 600 may be formed of various plastics or other materials that would be appreciated by one of ordinary skill in the art having the benefit of this disclosure.

FIG. 15 shows an interior view of the lower portion 415 of the body 500 with the mouth piece 520 removed. Likewise, FIG. 14 shows an interior view of the upper portion 405 of the body 500 with the mouth piece 520 removed. The upper and lower portions 405 and 415 form an interior cavity through which a user may blow through to produce a sound of a desire animal, such as a duck. The interior portions of the body 500 may be configured to include various structures that mimic anatomical features of a duck so that the call 600 produces an authentic sound. The cavity may include a first portion 431 adjacent the first opening 430, a second portion 432, and a third portion 433. The first and second portions 431 and 432 are generally enclosed by the body 500 and may have different diameters. The diameter of the first portion 431 may be smaller than the diameter of the second portion 432. As shown in FIGS. 14 and 15, each of the portions 431 and 432 may not have a constant diameter. The third portion 433 of the cavity may be positioned adjacent the second opening 420, which may generally correspond to the mouth of a duck. Thus, the third portion 433 of the cavity may not be entirely enclosed, but rather be open to the exterior by gaps between the upper and lower portions 405 and 415 of the body 500.

The upper and lower portions 405 and 415 may include grooves 440 that affect the sound produced by the call 600. The grooves 440 may be positioned and/or configured to mimic teeth plates of a duck. The lower portion 415 may include a longitudinal upstanding structure 425 that extends from the body 500 into the cavity. The structure 425 may mimic a tongue of a duck except that it is connected to the lower portion 415 of the body 500 along its entire length. The interior of the upper portion 405 of the body 500 may include various features 411, 450, and 455 that may affect the sound as air is blown through the body 500. For example, the features 450 and 455 may mimic various hard palate details such as a salivary gland and feature 411 may mimic a nasal junction.

FIG. 16 shows one embodiment of a reed system 700 that may be used with a game call 200, 300, or 600. The reed system 700 includes a mouth piece 720 and a reed 710. Reed adjustment adapters 730 are positioned adjacent the reed 710 and may be used to change the position and thus, the sound produced by the reed 710 in combination with the mouth piece 720 and a game call 200, 300, or 600. The mouth piece 720 may be used in place of the mouth pieces 120 and/or 520 discussed herein.

Figure 17:
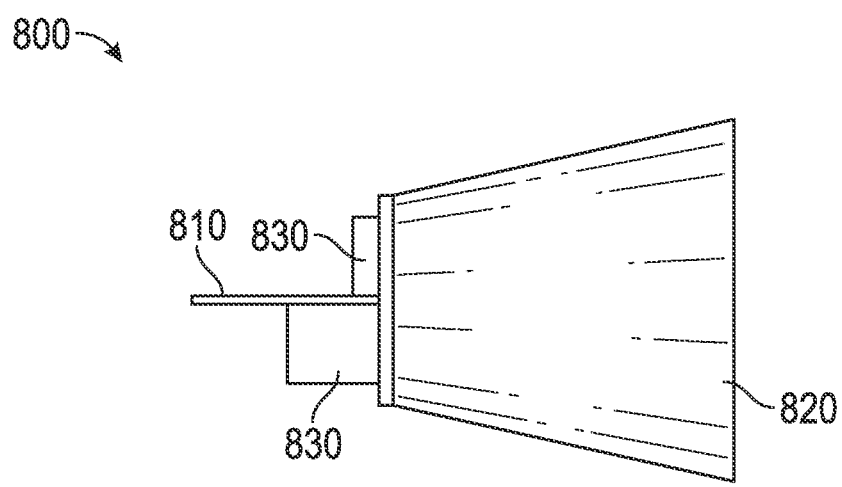
FIG. 17 shows an embodiment of a reed system that may be used in with a game call.

FIG. 17 shows one embodiment of a reed system 800 that may be used with a game call 200, 300, or 600. The reed system 800 includes a mouth piece 820 and a reed 810. Reed adjustment adapters 830 are positioned adjacent the reed 810 and may be used to change the position and thus, the sound produced by the reed 810 in combination with the mouth piece 820 and a game call 200, 300, or 600. The mouth piece 820 may be used in place of the mouth pieces 120 and/or 520 discussed herein.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:
1. A mouth operated game call comprising:
 a game call body;
 a cavity within the game call body;
 a single opening at a first end of the game call body, the single opening at the first end in communication with the cavity;
 a mouth piece connected to the first end of the game call body, a bore in the mouth piece in communication with the cavity within the game call body;
 an opening at a second end of the game call body, the opening at the second end in communication with the cavity, wherein the cavity opens to the exterior of the game call body through the opening at the second end of the game call body;
 a first aperture in the body in communication with the cavity, the first aperture located closer to the second end of the game call body than the first end of the game call body;
 a second aperture in the game call body in communication with the cavity, the second aperture located closer to the second end of the game call body than the first end of the game call body; and
 a longitudinal upstanding structure within the cavity, wherein at least a portion of the upstanding structure is positioned adjacent the opening at the second end of the game call.

2. The call of claim 1, wherein the first and second apertures are in communication with the cavity via an internal passage within the game call body and an internal opening.

3. The call of claim 1, wherein an entire length of the upstanding structure is integral with the game call body.

4. The call of claim 1, wherein the game call body at the second end further comprises an upper portion and a lower portion separated by the second opening.

5. The call of claim 4, further comprising a plurality of ridges on the upper portion.

6. The call of claim 5, wherein the ridges are positioned at outer edges of the upper portion.

7. The call of claim 1, wherein the cavity of the game call body has a first portion, a second portion, and a third portion, the first portion being a bore having a first diameter, the second portion being a bore having a second diameter that differs from the first diameter, and the third portion that separates the body at the second end into an upper portion and a lower portion.

8. The call of claim 1, wherein the game call body is comprised of plastic.

9. The call of claim 1, further comprising a reed connected to the mouth piece.

10. A mouth operated game call comprising:
a game call body;
a cavity within the game call body;
a single opening at a first end of the game call body, the single opening at the first end in communication with the cavity;
an opening at a second end of the game call body, the opening at the second end in communication with the cavity, wherein the cavity opens to the exterior of the game call body through the opening at the second end of the game call body;
a first aperture in the game call body in communication with the cavity, the first aperture located closer to the second end of the game call body than the first end of the game call body;
a second aperture in the game call body in communication with the cavity, the second aperture located closer to the second end of the game call body than the first end of the game call body;
wherein the game call body at the second end further comprises an upper portion and a lower portion separated by the second opening.

11. The call of claim 10, further comprising a longitudinal upstanding structure within the cavity, wherein at least a portion of the upstanding structure is positioned adjacent the opening at the second end.

12. The call of claim 11, wherein the longitudinal upstanding structure is shaped to mimic a tongue.

13. The call of claim 12, wherein an entire length of the upstanding structure is integral with the game call body.

14. The call of claim 10, wherein the first and second apertures are in communication with the cavity via a third opening in the upper portion.

15. The call of claim 14, further comprising a passage within the upper portion that connects the third opening with the first and second apertures, wherein the passage is separate from the cavity of the game call body.

16. The call of claim 15, further comprising a structure that divides the passage into a first portion connected to the first aperture and a second portion connected to the second aperture.

17. The call of claim 10, further comprising a plurality of ridges on the upper portion.

18. The call of claim 17, wherein the upper portion includes a first set of projections on an outer edge within the cavity and wherein the upper portion includes a second set of projections on an outer edge within the cavity opposite the first set of protrusions.

19. The call of claim 18, wherein the lower portion includes a first set of projections positioned adjacent the second end of the game call body.

20. The call of claim 10, wherein the opening at the first end of the game call body has a smaller diameter than the opening at the second end of the game call body.

21. The call of claim 10, wherein the game call body is comprised of plastic.

22. The call of claim 10, wherein at least a portion of an exterior of the game call body includes a camouflage pattern.

23. The call of claim 10, further comprising a reed positioned adjacent the single opening at the first end of the game call body.

* * * * *